United States Patent
Dhammawat et al.

(10) Patent No.: US 11,611,875 B2
(45) Date of Patent: Mar. 21, 2023

(54) OPTIMIZED SIMULTANEOUS AUTHENTICATION OF EQUALS (SAE) AUTHENTICATION IN WIRELESS NETWORKS

(71) Applicant: Cisco Technology, Inc., San Jose, CA (US)

(72) Inventors: Abhishek Dhammawat, San Jose, CA (US); Mansi Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 107 days.

(21) Appl. No.: 17/203,898

(22) Filed: Mar. 17, 2021

(65) Prior Publication Data

US 2021/0204125 A1 Jul. 1, 2021

Related U.S. Application Data

(63) Continuation of application No. 16/192,590, filed on Nov. 15, 2018, now Pat. No. 10,966,087.

(51) Int. Cl.
*H04W 12/06* (2021.01)
*H04W 12/106* (2021.01)
(Continued)

(52) U.S. Cl.
CPC ....... *H04W 12/06* (2013.01); *H04W 12/0431* (2021.01); *H04W 12/106* (2021.01);
(Continued)

(58) Field of Classification Search
CPC ............................ H04W 12/06; H04W 12/106
(Continued)

(56) References Cited

U.S. PATENT DOCUMENTS

| 2012/0005731 A1 | 1/2012 | Lei et al. |
| 2013/0176897 A1 | 7/2013 | Wang et al. |

(Continued)

OTHER PUBLICATIONS

International Search Report and The Written Opinion of the International Search Authority issued application PCT/US2019/060528, dated Jan. 24, 2020 (19 pages).

(Continued)

*Primary Examiner* — Anthony D Brown
(74) *Attorney, Agent, or Firm* — Merchant & Gould P.C.

(57) ABSTRACT

Authentication with security in wireless networks may be provided. A first confirm message comprising a first send-confirm element and a first confirm element may be received. Next, an Authenticator Number Used Once (ANonce) may be generated and a second confirm message may be sent comprising the ANonce, a second send-confirm element, and a second confirm element. Then an association request may be received comprising a Supplicant Number Used Once (SNonce) and a Message Integrity Code (MIC). An association response may be sent comprising an encrypted Group Temporal Key (GTK), an encrypted Integrity Group Temporal Key (IGTK), the ANonce, and the MIC. An acknowledgment may be received comprising the MIC in an Extensible Authentication Protocol (EAP) over LAN (EAPoL) key frame and a controller port may be unblocked in response to receiving the acknowledgment.

19 Claims, 4 Drawing Sheets

(51) Int. Cl.
  *H04W 12/0431* (2021.01)
  *H04L 9/30* (2006.01)
  *H04W 84/12* (2009.01)
  *H04W 88/08* (2009.01)

(52) U.S. Cl.
  CPC .......... *H04L 9/3066* (2013.01); *H04W 84/12* (2013.01); *H04W 88/08* (2013.01)

(58) Field of Classification Search
  USPC ....................................................... 713/181
  See application file for complete search history.

(56) References Cited

U.S. PATENT DOCUMENTS

2014/0351932 A1    11/2014  Abraham et al.
2016/0374118 A1*  12/2016  Mestanov ............. H04L 63/205
2017/0230826 A1     8/2017  Mestanov et al.

OTHER PUBLICATIONS

"Security", IEEE Draft; REVMD CL 12.FM, IEEE-SA, Piscataway, NJ USA—vol. 802.llmd drafts; 802.11 drafts; 802.llm drafts, No. D1.612, Oct. 2018 (Oct. 12, 2018), pp. 1-209, XP068138142, Retrieved from the Internet: URL:www.ieee802.org/11/private/Draft-Standards/llmd/REVmd Cl 12.fm.rtf [retrieved on Oct. 12, 2018] Sections 12.4.1-12.4.7 (209 pages).

* cited by examiner

OPTIMIZED SIMULTANEOUS AUTHENTICATION OF EQUALS (SAE) AUTHENTICATION IN WIRELESS NETWORKS

RELATED APPLICATION

The present application is a continuation of and claims priority to U.S. patent application Ser. No. 16/192,590, filed on Nov. 15, 2018, the disclosure of which is hereby incorporated in its entirety by reference.

TECHNICAL FIELD

The present disclosure relates generally to wireless networks, in particular to authentication in wireless networks.

BACKGROUND

In computer networking, a wireless access point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the wireless AP then provides wireless connections using radio frequency links for other devices to utilize that wired connection. Most APs support the connection of multiple wireless devices to one wired connection. Modern APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Authentication with security in wireless networks may be provided. A first confirm message comprising a first send-confirm element and a first confirm element may be received. Next, an Authenticator Number Used Once (ANonce) may be generated and a second confirm message may be sent comprising the ANonce, a second send-confirm element, and a second confirm element. Then an association request may be received comprising a Supplicant Number Used Once (SNonce) and a Message Integrity Code (MIC). An association response may be sent comprising an encrypted Group Temporal Key (GTK), an encrypted Integrity Group Temporal Key (IGTK), the ANonce, and the MIC. An acknowledgment may be received comprising the MIC in an Extensible Authentication Protocol (EAP) over LAN (EAPoL) key frame and a controller port may be unblocked in response to receiving the acknowledgment.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Simultaneous Authentication of Equals (SAE) may be used to authenticate devices on a Wireless Local Area Network (WLAN). Using SAE authentication, however, may have many drawbacks. These drawbacks may include a number of frames/messages exchanged thus creating the disadvantages of higher latency and less efficient client association flow. Furthermore, SAE has the disadvantage of increased network messaging for each client creating an additional load on Access Points (APs) and Wireless Local Area Network Controllers (WLCs) thus affecting the network handling capacity in terms of clients joining or roaming.

Embodiments of the disclosure may optimize or improve the SAE call flow for authentication. This optimization, for example, may reduce the per-client join call flow by three messages (e.g., approximately a 25% improvement) as compared to conventional processes. Consequently, embodiments of the disclosure may provide reduced latency with a smaller network message load because the number of per-client association messages may be reduced. Accordingly, AP and WLC load may be reduced by embodiments of the disclosure.

Figure 1:
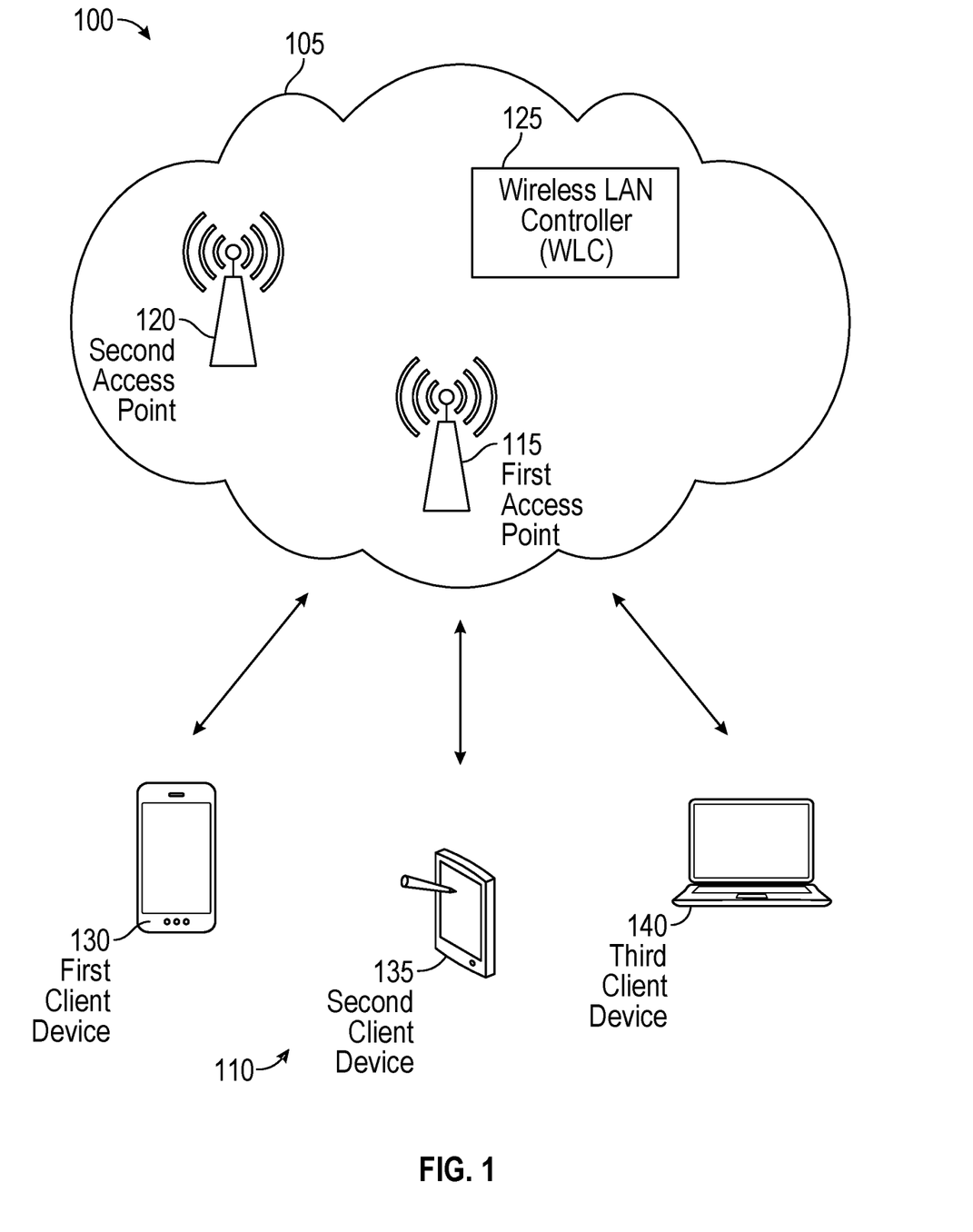
FIG. 1 shows an operating environment for optimized Simultaneous Authentication of Equals (SAE) authentication in wireless networks.

FIG. 1 shows an operating environment 100 consistent with embodiments of the disclosure for providing authentication with security in wireless networks. As shown in FIG. 1, operating environment 100 may comprise a Wireless Local Area Network (WLAN) 105 and a plurality of client devices 110. WLAN 105 may comprise a first access point 115, a second access point 120, and a Wireless Local Area Network Controller (WLC) 125. First access point 115 and second access point 120 may connect to, for example, a wired Ethernet connection and may provide wireless connections using radio frequency links for plurality of client devices 110 to utilize that wired connection. WLC 125 may control and coordinate the operation of first access point 115 and second access point 120 in providing wireless connections for plurality of client devices 110. Furthermore, WLC 125 may access and control first access point 115 and second access point 120 in order to provide roaming for plurality of client devices 110 within WLAN 105.

Plurality of client devices 110 may comprise a first client device 130, a second client device 135, and a third client device 140. Ones of plurality of client devices 110 may comprise, but is not limited to, a tablet device, a mobile device, a smart phone, a telephone, a remote control device, a personal computer, a network computer, or other similar device capable of accessing and using WLAN 105.

Figure 2:
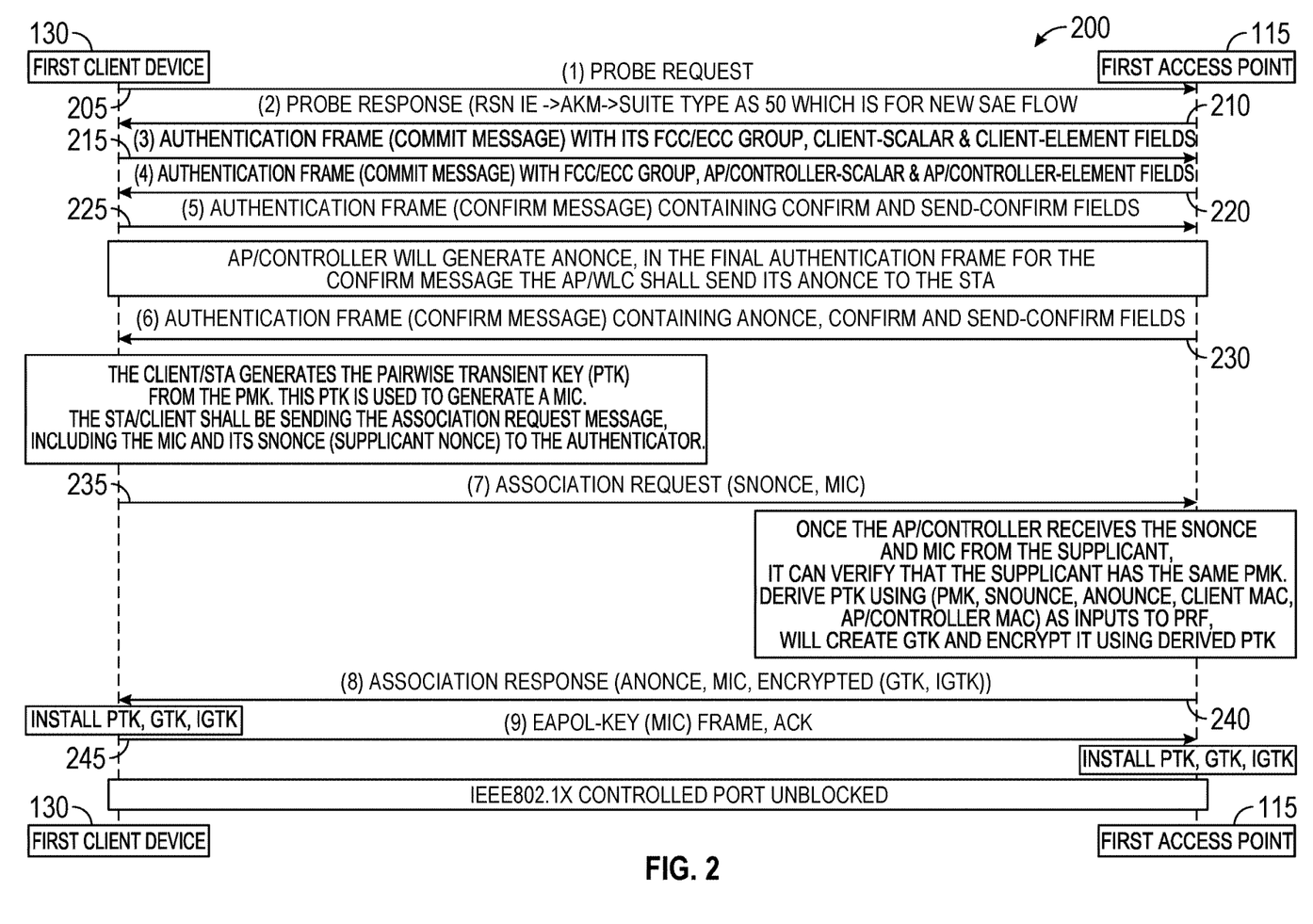
FIG. 2 is a state diagram of a method for providing optimized SAE authentication in wireless networks.

FIG. 2 is a state diagram of a method 200 for providing authentication with security in wireless networks consistent with an embodiment of the disclosure. Method 200 may be implemented using operating environment 100 as described in more detail above with respect to FIG. 1. Operations carried out by first client device 130 may also be carried out by second client device 135 or third client device 140. Similarly, operations carried out by first access point 115 may also be carried out by second access point 120 or WLC 125. Ways to implement the stages of method 200 will be described in greater detail below.

As shown in FIG. 2, first client device 130 (e.g., a supplicant) may send a probe request to discover SAE networks (state 205). In response to receiving the probe request, first access point 115 (e.g., an authenticator) may check its configuration for SAE Finite Field Cryptography (FFC) and (Elliptic Curve Cryptography (ECC) groups identifying its SAE capability. If first access point 115 has SAE capability, first access point 115 may respond to first client device 130 with a probe response (state 210). The probe response, for example, may be with AKM having suite Type as 50 inside RSN IE that may indicate support for the optimized SAE. The suite Type value may be any from a reserved pool from 14 to 255. Here, 50 may be used from the reserve pool as an example.

In response to receiving the probe response, first client device 130 may check its configuration for FFC and ECC groups and select one group based on priority. First client device 130 may also use its configured password (e.g., per WLAN) to generate a password element (PWE) along with two additional random numbers (e.g., rand and mask) for generating a scalar and an element. First client device 130 may then send an authentication frame (e.g. a first commit message) containing the scalar, the element, and the FFC/ECC selected group to first access point 115 (state 215).

On receiving the first commit message, first access point 115 may check its configuration to confirm that the FFC/ECC group proposed by first client device 130 is present at its end. First access point 115 may also use its configured password (e.g., per WLAN) to generate the PWE, which should be the same as the one generated by first client derive 130 as described above. First access point 115 may also use two random numbers (e.g., rand and mask) at its end for generating its scalar and element. First access point 115 may then send an authentication frame (e.g., a second commit message) to first client device 130 containing its own scalar, element, and the FFC/ECC selected group (state 220).

In response to the second commit message, first client device 130 may send an authentication frame (e.g., a first confirm message) containing send-confirm and confirm elements to first access point 115 (state 225). First client device 130 may also determine a Pairwise Master Key (PMK) and a PMK ID.

On receiving the first confirm message, first access point 115 may send an authentication frame (e.g., a second confirm message) to first client device 130 containing the send-confirm and the confirm fields and may also compute the PMK and the PMK ID. First access point 115 may also generate an Authenticator Number used once (ANonce) and may also send the ANonce in the second confirm message (state 230). At this point in method 200, the SAE authentication may be complete for first client device 130 with the PMK & PMKID generated at first access point 115 for example.

First client device 130, in response to receiving the second confirm message, may send to first access point 115 an association request along with a Supplicant Number used once (SNonce), a Message Integrity Code (MIC) along with other association request parameters (state 235). First client device 130 may generate a Pairwise Transient Key (PTK) from the PMK. This PTK may be used to generate the MIC.

First access point 115, on receiving the association request with the SNonce and the MIC, may have the inputs for generating the PTK by utilizing the PMK, SNonce, ANonce (e.g., previously generated by first access point 115), first client device 130's Media Access Control (MAC) address, and first access point 115's MAC address. First access point 115 may generate the PTK and may also generate a Group Temporal Key (GTK) and encrypt it using the PTK to communicate the same to first client device 130.

Once first access point 115 receives the SNonce and MIC from first client device 130 (e.g., the supplicant), it can verify that first client device 130 has the same PMK. This may be done by using the PTK generated at first access point 115 from the PMK to generate a MIC against the SNonce. If the MICs match, this may indicate that first access point 115 and first client device 130 have the same PMK. After first access point 115 verifies the MIC sent from first client device 130, first access point 115 may send back to first client device 130 an association response containing an encrypted GTK, an encrypted Integrity Group Temporal Key (IGTK), the ANonce, and the MIC (state 240). The association response message may indicate to first client device 130 that the verification was successful.

First client device 130 on receiving the association response may have the information to verify that first access point 115 has the same PMK. In response to verifying that first access point 115 has the same PMK, first client device 130 may then send the MIC in an EAPOL-key frame to first access point 115 acknowledging successful handshaking (state 245). At this point, a controller port (e.g., IEEE 802.1X controller port) may be unblocked allowing data traffic to flow between first access point 115 and first client device 130.

Figure 3:
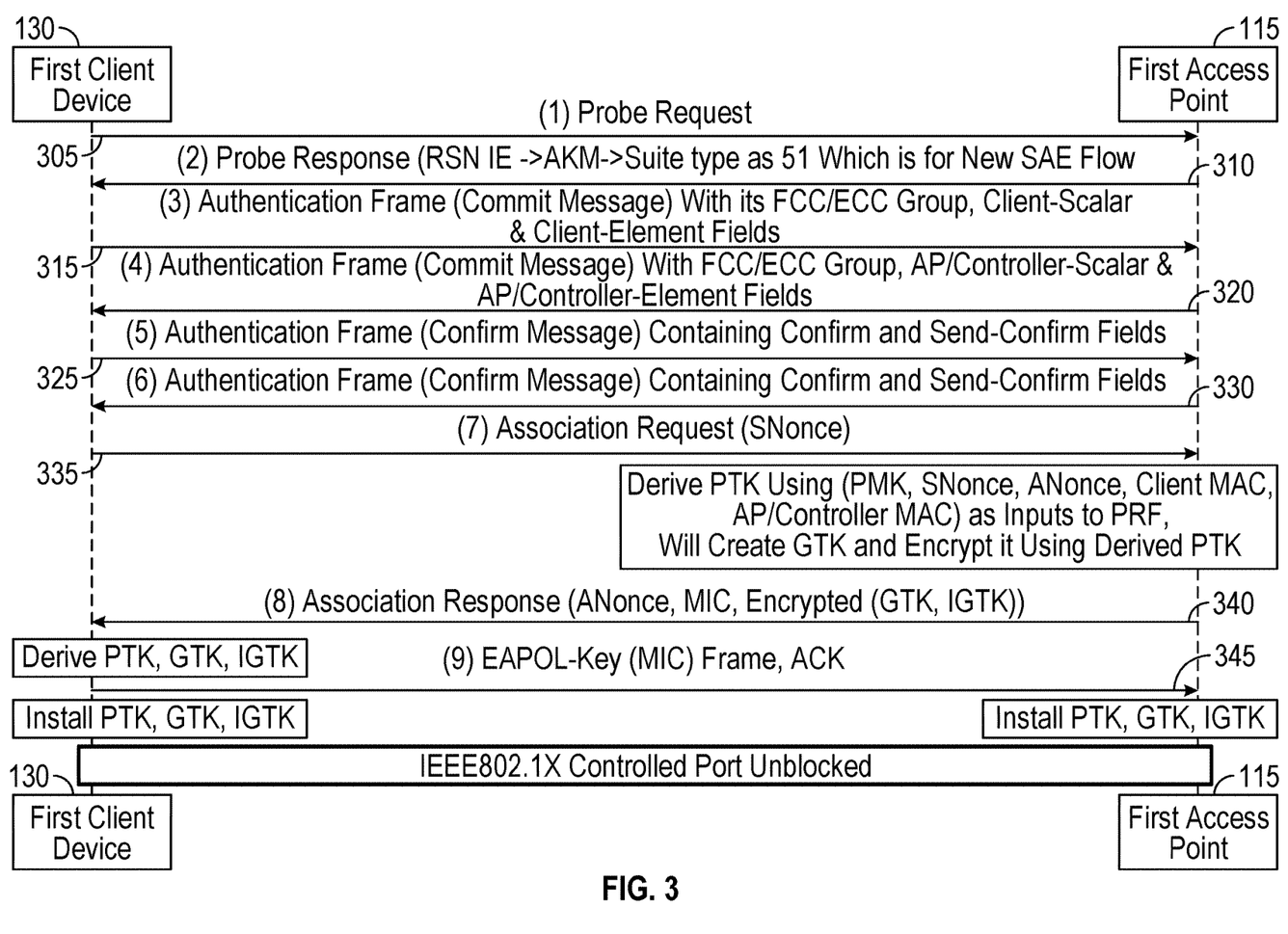
FIG. 3 is a state diagram of a method for providing optimized SAE authentication in wireless networks.

FIG. 3 is a state diagram of a method 300 for providing authentication with security in wireless networks consistent with an embodiment of the disclosure. Method 300 may be implemented using operating environment 100 as described in more detail above with respect to FIG. 1. Operations carried out by first client device 130 may also be carried out by second client device 135 or third client device 140. Similarly, operations carried out by first access point 115 may also be carried out by second access point 120 or WLC 125. Ways to implement the stages of method 300 will be described in greater detail below.

As shown in FIG. 3, first client device 130 (e.g., a supplicant) may send a probe request to discover SAE networks (state 305). In response to receiving the probe request, first access point 115 (e.g., an authenticator) may check its configuration for SAE Finite Field Cryptography (FFC) and (Elliptic Curve Cryptography (ECC) groups identifying its SAE capability. If first access point 115 has SAE capability, first access point 115 may respond to first client device 130 with a probe response (state 310). The probe response, for example, may be with AKM having suiteType as 51 inside RSN IE that may indicate optimized SAE support. The suiteType value may be any from a reserved pool from 14 to 255. Here, 51 may be used from the reserve pool as an example.

In response to receiving the probe response, first client device 130 may check its configuration for FFC and ECC groups and select one group based on priority. First client device 130 may also use its configured password (e.g., per WLAN) to generate a password element (PWE) along with two additional random numbers (e.g., rand and mask) for generating a scalar and an element. First client device 130 may then send an authentication frame (e.g. a first commit message) containing the scalar, the element, and the FFC/ECC selected group to first access point 115 (state 315).

On receiving the first commit message, first access point 115 may check its configuration to confirm that the FFC/ECC group proposed by first client device 130 is present at its end. First access point 115 may also use its configured password (e.g., per WLAN) to generate the PWE, which should be the same as the one generated by first client derive 130 as described above. First access point 115 may also use two random numbers (e.g., rand and mask) at its end for generating its scalar and element. First access point 115 may then send an authentication frame (e.g., a second commit message) to first client device 130 containing its own scalar, element, and the FFC/ECC selected group (state 320).

In response to the second commit message, first client device 130 may send an authentication frame (e.g., a first confirm message) containing send-confirm and confirm elements to first access point 115 (state 325).

First access point 115 may send, in response to receiving the first confirm message, an authentication frame (e.g., a second confirm message) to first client device 130 containing the send-confirm and confirm fields (state 330). First access point 115 may also determine the PMK and PMK ID. In response to receiving the second confirm message, first client device 130 may send an association request to first access point 115 along with a SNonce and other association request parameters (state 335). First client device 130 may also determine a Pairwise Master Key (PMK) and a PMK ID.

First access point 115, on receiving the association request with the SNonce may have the inputs for generating the PTK by utilizing the PMK, the SNonce, an ANonce (e.g., generated by first access point 115), first client device 130's MAC address, and first access point 115's MAC address. First access point 115 may derive the PTK and may also generate the GTK and encrypt it using PTK to communicate the same to first client device 130. First access point 115 may send back the association response containing the encrypted GTK, the encrypted IGTK, the ANonce, and the MIC to first client device 130 (state 340).

First client device 130 on receiving the association response may have the information to generate the PTK because it may have the PMK, the SNonce, the ANonce (e.g., generated first access point 115), first client device 130's MAC address, and first access point 115's MAC address. Accordingly, first client device 130 may verify that first access point 115 has the same PMK. In response to verifying that first access point 115 has the same PMK, first client device 130 may then send the MIC in an EAPOL-key frame to first access point 115 acknowledging successful handshaking (state 345). At this point, a controller port (e.g., IEEE 802.1X controller port) may be unblocked allowing data traffic to flow between first access point 115 and first client device 130.

Embodiments of the disclosure with respect to FIG. 3 may not have the ANonce first sent by the authenticator (i.e., first access point 115), so the MIC may not be first sent by the supplicant (i.e., first client device 130). This may not pose a security issue because the PMK may be different in SAE authentication for each session. Accordingly, a brute force attack may not be accomplished using different sessions.

In the scenario where there may be multiple association requests coming with different SNonces, WLC 125 may invalidate and reject them, for example, with a reason code "Invalid SNonce" and may cleanup the session. An attacker trying to establish a session multiple times may be blacklisted. Consequently, there may not be a security issue if the MIC is not sent by the client.

Figure 4:
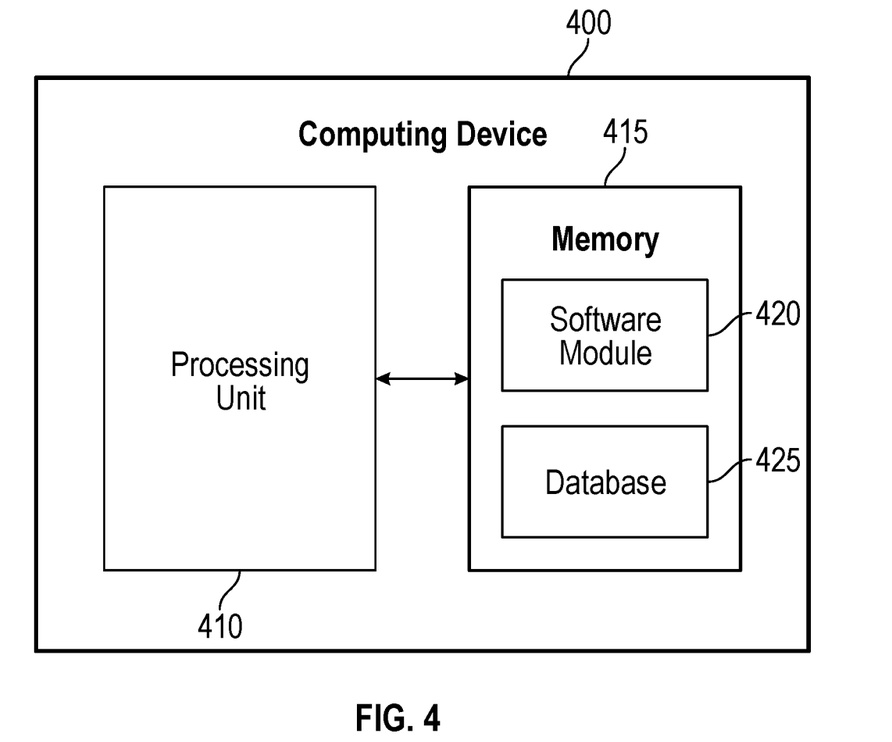
FIG. 4 shows a computing device.

FIG. 4 shows a computing device 400. As shown in FIG. 4, computing device 400 may include a processing unit 410 and a memory unit 415. Memory unit 415 may include a software module 420 and a database 425. While executing on processing unit 410, software module 420 may perform processes for providing authentication with security in wireless networks, including for example, any one or more of the stages from method 200 described above with respect to FIG. 2 or any one or more of the stages from method 300 described above with respect to FIG. 3. Computing device 400, for example, may provide an operating environment for first AP 115, second AP 120, WLC 125, or any of plurality of client devices 110. First AP 115, second AP 120, WLC 125, or any of plurality of client devices 110 may operate in other environments and are not limited to computing device 400.

Computing device 400 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   sending, by a computing device, a second confirm message comprising a second send-confirm element and a second confirm element;
   receiving, by the computing device, an association request comprising a Supplicant Number Used Once (SNonce);
   sending, by the computing device, an association response comprising an encrypted Group Temporal Key (GTK), an encrypted Integrity Group Temporal Key (IGTK), an Authenticator Number Used Once (ANonce), and a Message Integrity Code (MIC) wherein sending, by the computing device, the association response comprising the encrypted GTK, the encrypted IGTK, the ANonce, and the MIC comprises;
   generating a Pairwise Transient Key (PTK) from a Pairwise Master Key (PMK), the SNonce, and the ANonce,
   encrypting the GTK using the PTK, and
   encrypting the IGTK using the PTK;
   receiving, by the computing device, an acknowledgment comprising the MIC in an Extensible Authentication Protocol (EAP) over LAN (EAPoL) key frame; and
   unblocking, by the computing device, a controller port in response to receiving the acknowledgment.

2. The method of claim 1, wherein sending, by the computing device, comprises sending, by the computing device comprising a wireless Access Point.

3. The method of claim 1, wherein sending, by the computing device, comprises sending, by the computing device comprising a Wireless LAN Controller (WLC).

4. The method of claim 1, further comprising receiving, by the computing device, a probe request indicating support for optimized Simultaneous Authentication of Equals (SAE) authentication.

5. The method of claim 4, further comprising sending, by the computing device in response to the probe request, a probe response in response to the computing device determining that the computing device is capable of the optimized SAE authentication.

6. The method of claim 1, further comprising, prior to sending the second confirm message:
   receiving, by the computing device, a first confirm message comprising a first send-confirm element and a first confirm element.

7. The method of claim 1, further comprising:
   receiving, by the computing device prior to sending the second commit message, a first commit message comprising a first scalar and a first element and identifying a first selected group comprising one of the following: Finite Field Cryptography (FFC) and Elliptic Curve Cryptography (ECC); and
   sending, by the computing device, a second commit message comprising a second scalar and a second element and identifying a second selected group comprising one of the following: Finite Field Cryptography (FFC) and Elliptic Curve Cryptography (ECC).

8. A method comprising:
receiving, by a computing device, a first confirm message comprising a first send-confirm element and a first confirm element;
sending, by the computing device, a second confirm message comprising a second send-confirm element and a second confirm element;
receiving, by the computing device, an association request comprising a Supplicant Number Used Once (SNonce);
sending, by the computing device, an association response comprising an encrypted Group Temporal Key (GTK), an encrypted Integrity Group Temporal Key (IGTK), an Authenticator Number Used Once (ANonce), and a Message Integrity Code (MIC) wherein sending, by the computing device, the association response comprising the encrypted GTK, the encrypted IGTK, the ANonce, and the MIC comprises;
generating a Pairwise Transient Key (PTK) from a Pairwise Master Key (PMK), the SNonce, and the ANonce,
encrypting the GTK using the PTK, and
encrypting the IGTK using the PTK;
receiving, by the computing device, an acknowledgment comprising the MIC in an Extensible Authentication Protocol (EAP) over LAN (EAPoL) key frame; and
unblocking, by the computing device, a controller port in response to receiving the acknowledgment.

9. The method of claim 8, wherein sending, by the computing device, comprises sending, by the computing device comprising a wireless Access Point.

10. The method of claim 8, wherein sending, by the computing device, comprises sending, by the computing device comprising a Wireless LAN Controller (WLC).

11. The method of claim 8, further comprising receiving, by the computing device, a probe request indicating support for optimized SAE authentication.

12. The method of claim 8, further comprising sending, by the computing device prior to receiving the first confirm message, a second commit message comprising a second scalar and a second element and identifying a second selected group comprising one of the following: Finite Field Cryptography (FFC) and Elliptic Curve Cryptography (ECC).

13. The method of claim 12, further comprising receiving, by the computing device prior to sending the second commit message, a first commit message comprising a first scalar and a first element and identifying a first selected group comprising one of the following: Finite Field Cryptography (FFC) and Elliptic Curve Cryptography (ECC).

14. An apparatus comprising:
a memory storage; and
a processing unit coupled to the memory storage, wherein the processing unit is operative to:
receive a first confirm message comprising a first send-confirm element and a first confirm element;
send a second confirm message comprising a second send-confirm element and a second confirm element;
receive an association request comprising a Supplicant Number Used Once (SNonce);
send an association response comprising an encrypted Group Temporal Key (GTK), an encrypted Integrity Group Temporal Key (IGTK), an Authenticator Number Used Once (ANonce), and a Message Integrity Code (MIC) wherein the processing unit being operative to send the association response comprising the encrypted GTK, the encrypted IGTK, the ANonce, and the MIC comprises the processing unit being operative to;
generate a Pairwise Transient Key (PTK) from a Pairwise Master Key (PMK), the SNonce, and the ANonce,
encrypt the GTK using the PTK, and
encrypt the IGTK using the PTK;
receive an acknowledgment comprising the MIC in an Extensible Authentication Protocol (EAP) over LAN (EAPoL) key frame;
install a Pairwise Transient Key (PTK), a GTK, and an IGTK; and
unblock a controller port in response to receiving the acknowledgment.

15. The apparatus of claim 14, wherein the processing unit is disposed in a wireless Access Point.

16. The apparatus of claim 14, wherein the processing unit is disposed in a Wireless LAN Controller (WLC).

17. The apparatus of claim 14, wherein the processing unit is further operative to receive a probe request indicating support for optimized SAE authentication.

18. The apparatus of claim 17, wherein the processing unit is further operative to send a probe response in response to determining that the apparatus is capable of optimized Simultaneous Authentication of Equals (SAE) authentication.

19. The apparatus of claim 14, wherein the processing unit is further operative to send, prior to receiving the first confirm message, a second commit message comprising a second scalar and a second element and identifying a second selected group comprising one of the following: Finite Field Cryptography (FFC) and Elliptic Curve Cryptography (ECC).

* * * * *